United States Patent
Choi (10) Patent No.: US 10,103,881 B2
(45) Date of Patent: Oct. 16, 2018

(54) PERMUTATION METHOD FOR CORRECTING BIT ERROR IN QUANTUM KEY DISTRIBUTION PROTOCOL

(71) Applicant: SK TELECOM CO., LTD., Seoul (KR)

(72) Inventor: Jeong-woon Choi, Yongin-si (KR)

(73) Assignee: SK TELECOM CO., LTD., Seoul (KR)

( * ) Notice: Subject to any disclaimer, the term of this patent is extended or adjusted under 35 U.S.C. 154(b) by 189 days.

(21) Appl. No.: 14/694,742

(22) Filed: Apr. 23, 2015

(65) Prior Publication Data

US 2015/0312035 A1    Oct. 29, 2015

Related U.S. Application Data

(63) Continuation of application No. PCT/KR2013/007611, filed on Aug. 26, 2013.

(30) Foreign Application Priority Data

Oct. 23, 2012    (KR) .................. 10-2012-0118138

(51) Int. Cl.
*H04L 9/08* (2006.01)

(52) U.S. Cl.
CPC ........ *H04L 9/0858* (2013.01); *H04L 2209/34* (2013.01)

(58) Field of Classification Search
USPC ........ 380/278, 255, 264, 276; 726/2, 21, 36; 713/150, 163, 181
See application file for complete search history.

(56) References Cited

U.S. PATENT DOCUMENTS

| | | | |
|---|---|---|---|
| 2003/0223579 A1* | 12/2003 | Kanter | H04L 9/304 380/28 |
| 2004/0109564 A1* | 6/2004 | Cerf | H04L 9/0858 380/256 |
| 2007/0009098 A1* | 1/2007 | Tanaka | H04L 1/242 380/30 |
| 2007/0014415 A1* | 1/2007 | Harrison | H04L 9/0858 380/278 |

(Continued)

FOREIGN PATENT DOCUMENTS

| | | |
|---|---|---|
| JP | 2002351499 A | 12/2002 |
| JP | 2004349833 A | 12/2004 |

(Continued)

OTHER PUBLICATIONS

International Search Report for PCT/KR2013/007611 dated Dec. 16, 2013.

(Continued)

*Primary Examiner* — Sharif E Ullah
(74) *Attorney, Agent, or Firm* — Hauptman Ham, LLP (57) ABSTRACT

A permutation method for reconciling bit errors in a quantum key reconciliation protocol performing an iterative reconciliation process, includes: obtaining a bit string through a previous reconciliation step; and permuting bits in athe bit string obtained from a the previous reconciliation step before a subsequent reconciliation step by performing a linear modulo operation based on a length of the bit string and a length of a block for the subsequent reconciliation step.

13 Claims, 5 Drawing Sheets

(56) References Cited

U.S. PATENT DOCUMENTS

| | | | |
|---|---|---|---|
| 2007/0230688 A1* | 10/2007 | Tajima | H04L 9/0858 380/30 |
| 2008/0292102 A1 | 11/2008 | Wang et al. | |
| 2010/0020964 A1* | 1/2010 | Horie | G06F 7/725 380/44 |
| 2011/0206204 A1* | 8/2011 | Sychev | H04J 14/02 380/256 |
| 2011/0311050 A1* | 12/2011 | Tomaru | H04B 10/70 380/256 |
| 2013/0101111 A1* | 4/2013 | Sharon | G11B 20/0021 380/28 |
| 2014/0068765 A1* | 3/2014 | Choi | H04L 9/0852 726/23 |

FOREIGN PATENT DOCUMENTS

| | | | |
|---|---|---|---|
| JP | 2009296217 A | 12/2009 | |
| JP | 2011061833 A | 3/2011 | |
| KR | 10-2011-0070694 A | 6/2011 | |

OTHER PUBLICATIONS

Chinese Office Action dated Feb. 17, 2017 in connection with the counterpart Chinese Patent Application No. 201380055185.X.

* cited by examiner

PERMUTATION METHOD FOR CORRECTING BIT ERROR IN QUANTUM KEY DISTRIBUTION PROTOCOL

CROSS-REFERENCE TO RELATED APPLICATIONS

The present application is a continuation of International Patent Application No. PCT/KR2013/007611, filed on Aug. 26, 2013, which is based upon and claims the benefit of priority to Korean Patent Application No. 10-2012-0118138, filed on Oct. 23, 2012. The disclosure of the above-listed applications are hereby incorporated by reference herein in their entirety.

TECHNICAL FIELD

The present disclosure in one or more embodiments relates to a permutation method for reconciling bit errors in a quantum key distribution protocol.

BACKGROUND

The statements in this section merely provide background information related to the present disclosure and do not necessarily constitute prior art.

Quantum key distribution (abbreviated below as QKD) utilizes uncertainty or randomness with a view to sharing an encryption key between a transmitter and a receiver, without leaking any information on the key to an eavesdropper.

A description is now given on a quantum key distribution procedure using the BB84 protocol, one of QKD protocols. Initially, a transmitter generates a random number sequence (sequence of 1s and 0s: transmission data), and randomly determines a transmission code (+: corresponding to a measuring apparatus capable of identifying light polarized in horizontal and vertical directions, x: corresponding to a measuring apparatus capable of identifying light polarized in diagonal directions). The polarization direction of transmitted light is automatically determined by using a combination of the random number sequence and the transmission code. This stage performs transmission of quantum signals such as horizontally polarized light with a combination of 0 and +, vertically polarized light with a combination of 1 and +, 45°-diagonally polarized light with a combination of 0 and x, and 135°-diagonally polarized light with a combination of 1 and x.

Then, a receiver randomly determines a reception code (as described above, +: capable of identifying light polarized in horizontal and vertical directions, x: capable of identifying light polarized in diagonal directions), and measures light on the quantum channel to obtain reception data (raw key). Here, the probability that the transmission and reception codes are identical to each other is 1/2, since the transmitter and the receiver have arbitrarily determined the transmission and reception codes, respectively. If or when the codes are identical, the receiver obtains the same bits as those in the random number sequence generated by the transmitter, as reception data. For example, the receiver obtains 0 with a combination of horizontally polarized light and reception code +, 1 with a combination of vertically polarized light and reception code +, 0 with a combination of 45°-diagonally polarized light and reception code x, and 1 with a combination of 135°-diagonally polarized light and reception code x. However, if or when the codes are not identical, there is no correlation between the random number sequence generated by the transmitter and the reception data measured by the receiver due to quantum mechanical characteristics.

The transmitter and the receiver then exchange and share code information to determine whether the transmission and reception codes are identical, and maintain only the random number sequence and the reception data corresponding to the identical part.

Subsequently, the transmitter and the receiver open a certain randomly determined part (e.g., half) of the residual random number sequence and the reception data to check a quantum bit error rate (abbreviated below as QBER), thereby determining whether any attacker eavesdrops. Although the remaining random number sequence and the reception data will be completely identical to each other when the transmission and reception systems and the channel have no error, in practical QKD systems QBER of about 3 to 7% usually occurs due to the imperfection of the transmission and reception systems and the channel. However, since an eavesdropping attack of an attacker increases the QBER to 25% or above (when the whole bit string is eavesdropped) based on the principle of quantum mechanics, a determination is made of whether an eavesdropping attack is present based on an appropriate reference value (e.g., 8%). If or when the QBER is above the appropriate reference value, eavesdropping is determined to be detected, and the QKD protocol is stopped and started over. Otherwise, if or when the QBER is equal to or below the appropriate reference value, a normal state is determined, and the rest of the random number sequence or the reception data remaining after QBER calculation is used as a sifted key.

The inventor(s) has noted that since the sifted key generated through the QKD protocol has bit errors of about 3 to 7% due to the imperfection of the channel and the transmission and reception systems, it is necessary to implement a post-processing protocol consisting of a reconciliation process for reconciling or removing bit errors and a privacy amplification process for removing information leaked in a quantum communication process and information leaked in the reconciliation process. The inventor(s) has experienced that the efficiency of a post-processing procedure in terms of operation and communication needs to be maximized to increase the key generation speed of a QKD protocol including the post-processing procedure.

SUMMARY

In accordance with at least one embodiment of the present disclosure, a permutation method for reconciling bit errors in a quantum key reconciliation protocol performing an iterative reconciliation process, the permutation method comprises: obtaining a bit string through a previous reconciliation step; and permuting bits in the bit string obtained from the previous reconciliation step before a subsequent reconciliation step by performing a linear modulo operation based on a length of the bit string and a length of a block for the subsequent reconciliation step.

In accordance with another embodiment of the present disclosure, a method for reconciling bit errors in a sifted key generated through a quantum key distribution (QKD) protocol, includes: repeatedly performing a reconciliation step including the substeps of: dividing a bit string subject to bit error reconciliation into one or more blocks having a predetermined length; searching for a block containing an odd number of bit errors among the divided one or more blocks by performing a parity check on each of the divided one or more blocks; and (3) performing a predetermined operation according to a reconciliation protocol on the block containing the odd number of the bit errors. Here, bits in a bit string reconciled in a previous reconciliation step are permuted before a subsequent reconciliation step by performing a linear modulo operation based on a length of the reconciled bit string and a length of a block for the subsequent reconciliation step.

In accordance with still another embodiment of the present disclosure, a non-transitory computer-readable medium having instructions stored thereon, which, when executed by at least one processor, cause the processor to perform permutation operations for reconciling bit errors in a quantum key reconciliation protocol performing an iterative reconciliation process, the permutation operations comprising: obtaining a bit string through a previous reconciliation step; and permuting bits in the bit string obtained from the previous reconciliation step before a subsequent reconciliation step by performing a linear modulo operation based on a length of the bit string and a length of a block for the subsequent reconciliation step.

DETAILED DESCRIPTION

Hereinafter, at least one embodiment of the present disclosure will be described in detail with reference to the accompanying drawings. In the following description, like reference numerals designate like elements, although the elements are shown in different drawings. Further, in the following description of the at least one embodiment, a detailed description of known functions and configurations incorporated herein will be omitted for the purpose of clarity and for brevity.

Some embodiments of the present disclosure provide a permutation method using only a linear modulo operation instead of random permutation to arbitrarily rearrange bit errors in a reconciliation process of a QKD post-processing procedure.

A permutation algorithm according to at least one embodiment of the present disclosure corresponds to a method for permuting bits in a reconciled bit string before a subsequent unit reconciliation process in a quantum key reconciliation protocol performing an iterative reconciliation process. A description thereof is now given using a reconciliation process according to Winnow protocol as an example.

The reconciliation process uses a variety of key reconciliation protocols. Some examples of the key reconciliation protocols include Cascade, Winnow and low density parity check (LDPC) protocols, and schemes capable of improving the efficiency of those protocols are currently suggested.

Figure 1A:
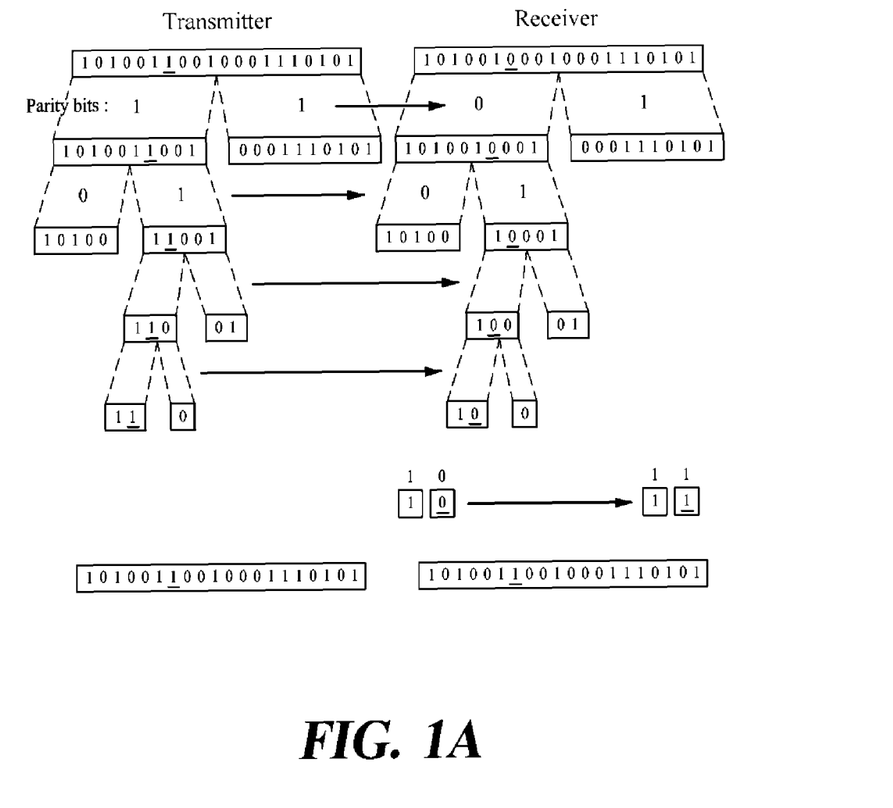
FIGS. 1A and 1B are diagrams showing Cascade protocol and Winnow protocol, respectively.
Figure 1B:
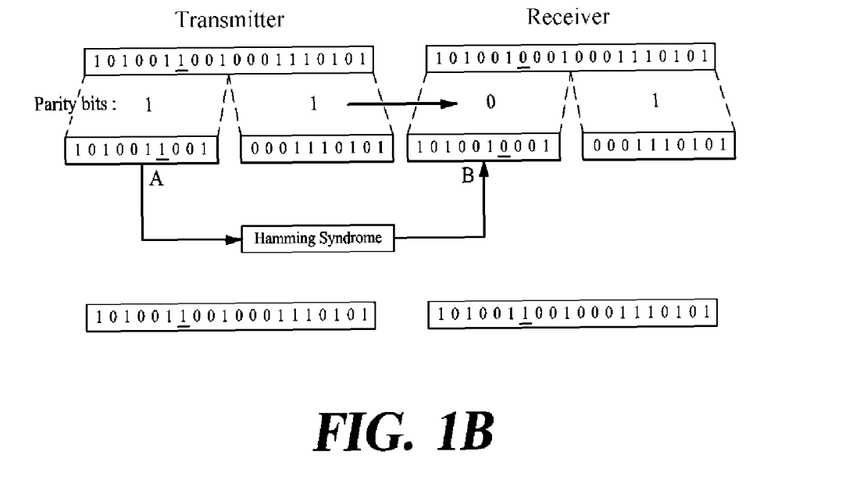

FIGS. 1A and 1B are diagrams showing Cascade protocol and Winnow protocol, respectively.

As illustrated in FIG. 1A, the Cascade protocol is adapted to divide a bit string into blocks having appropriate sizes, and reconcile or remove error bits included in each block by detecting the error bits through a binary search based on the parity operation of the respective blocks. The Cascade protocol is not appropriate to implement a high-speed QKD protocol: although the Cascade protocol does not generate additional bit errors during the reconciliation process, a single reconciliation process can reconcile a single bit error only in a block including an odd number of bit errors and thus should be repeated an enormous number of times to reconcile all bit errors.

The Winnow protocol illustrated in FIG. 1B is a scheme for using syndrome of a Hamming code to reconcile error bits in blocks having different parity bit, instead of binary search.

Table 1 organizes the features of the Cascade, Winnow and LDPC protocols.

TABLE 1

|  | Cascade | Winnow | LDPC |
|---|---|---|---|
| Operation complexity | Very simple | Very simple | Complicated |
| Number of communications | Large | Small (about 20) | 1 |

Most key reconciliation protocols used in a QKD post-processing protocol, e.g., Cascade and Winnow, reconcile bit errors in a multi-unit or iterative reconciliation process through interactive communication between the transmission and reception systems, and essentially perform an operation called random permutation or random shuffling to arbitrarily relocate the bit errors for every unit reconciliation process.

Bit errors remaining in each block after every unit reconciliation process need to be present only in an even number. If or when such a bit error distribution is constantly maintained, the residual bit errors will not be removed even after a subsequent unit reconciliation process. Considering this, random shuffling needs to be performed before the subsequent unit reconciliation process to arbitrarily relocate the bit errors.

For random shuffling, permutation information is generated in one party using a True Random Number Generator (TRNG) or a Pseudo Random Number Generator (PRNG) to provide n! permutation variabilities for a key bit string of length n generated in each unit reconciliation process, and is transmitted to an opposite party.

However, the inventor(s) has noted that the goal of permutation or shuffling in reconciliation is not to achieve randomness but to efficiently change an even number of bit errors in a block to an odd number.

Figure 2:
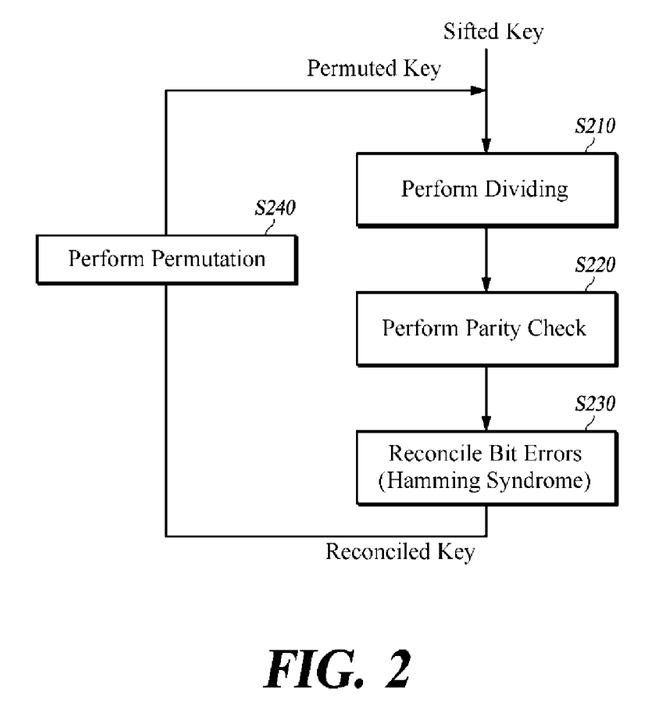
FIG. 2 is a diagram of a reconciliation process according to Winnow protocol.

FIG. 2 is a diagram of a reconciliation process according to Winnow protocol.

As described above, in the Winnow protocol, a transmitter and a receiver of a QKD system divide a sifted key into blocks having an appropriate size, calculate parity of each of the divided blocks, and compare the calculated parity to that calculated by the other communication party. A block having different parity values calculated includes an odd number of error bits, and the error bits of this block are found using Hamming syndrome. Such error bit reconciliation through block division and Hamming syndrome is repeatedly performed after bits in a bit string are permuted. Here, the length 'a' of the divided block is a multiple of 2 and is, for example, $a \in \{8, 16, 32, 64, 128, 256, 512\}$.

Although random permutation has been performed based on permutation information generated using a random number call algorithm in Step S240, according to the present disclosure, bits in a bit string are permuted by using a linear modulo operation based on the length 'n' of the bit string and the length 'a' of a block for a subsequent unit reconciliation process.

Figure 3:
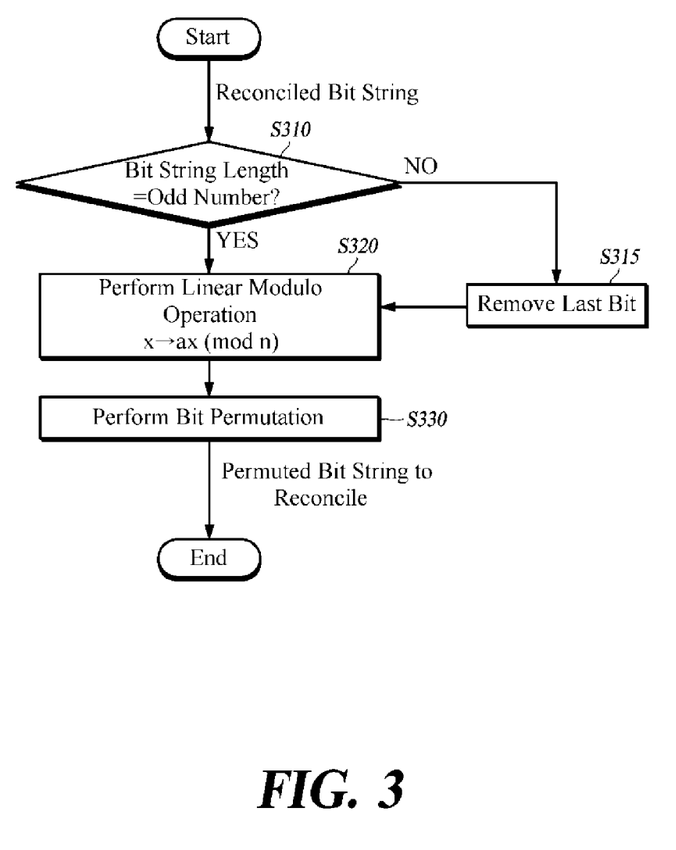
FIG. 3 is a flowchart of a permutation algorithm according to at least one embodiment of the present disclosure.

FIG. 3 is a flowchart of a permutation algorithm according to at least one embodiment of the present disclosure.

The permutation algorithm according to at least one embodiment of the present disclosure includes the following four main steps.

Step 1: Whether the length of a bit string subject to bit error reconciliation is an even number or an odd number is determined (S310).

Step 2: If or when the length of the bit string subject to bit error reconciliation is an even number, for example, the last bit is removed to change the bit string to an odd number length (n←n−1) (S315). If or when the length of the bit string is an odd number, no change is made.

Step 3: Bits in the bit string are permuted by performing a linear modulo operation given by Equation 1 for the location 'x' of an input bit string and the size 'a' of a block to be divided in a subsequent unit reconciliation process (S320). Here, 'a' is a multiple of 2 and is, for example, $a \in \{8, 16, 32, 64, 128, 256, 512\}$.

$$F: x \rightarrow ax(\bmod n) \quad \text{Equation 1}$$

In Equation 1, x denotes the location of a bit, a denotes the size of a block for a subsequent unit reconciliation process, and n denotes the length of a bit string.

Alternatively, the linear modulo operation 'F' of Equation 1 is replaced by Equation 2 for an arbitrary integer 'b' since the effect of the linear modulo operation is not changed even when the result of the linear modulo operation is shifted by an arbitrary value.

$$F: x \rightarrow ax+b(\bmod n) \quad \text{Equation 2}$$

Step 4: The bit at the location 'x' is relocated to F(x)=ax or ax+b(mod n). That is, bit permutation is performed based on the linear modulo operation 'F' of Equation 1 or Equation 2 (S330).

In order for the above permutation algorithm to work only by reordering bits in a bit string, the linear modulo operation 'F' satisfies one-to-one correspondence condition which is expressed by the following proposition.

Proposition: 'If or when $x \neq y$, then $ax \neq ay(\bmod n)$.'

The proposition is now proved through reductio ad absurdum. The contraposition of the above proposition is as follows:

Contraposition: 'If or when $ax \equiv ay(\bmod n)$, then x=y.'

If or when ax and ay are congruent modulo n, a(x−y) is a multiple of 'n' due to the properties of a modulo operation. Here, since 'n' is an odd number and 'a' is an even number, the greatest common divisor of 'n' and 'a' is 1, and thus 'x−y' is a multiple of 'n'. Since 'x' and 'y' are less than 'n', 'x−y' satisfies 'x−y=0' to be a multiple of 'n'. Consequently, 'x' and 'y' is equal. As such, the contraposition is true and thus the above proposition is also true.

The above description may be briefly expressed as follows.

$$ax \equiv ay(\bmod n) \Leftrightarrow n | a(x-y)$$

$$\Leftrightarrow n | x-y (\because \gcd(n,a)=1)$$

$$\Leftrightarrow x=y (\because 0 \leq x,y > n)$$

Meanwhile, steps 1 and 2 make up a procedure for allowing the linear modulo operation 'F' to satisfy one-to-one correspondence condition, i.e., to be a one-to-one function. Although the above description illustrates a method for changing the bit string to an odd number length to make the greatest common divisor of 'a' and 'n' equal to 1 considering that a is given in the form of a power of 2, e.g., 8, 16, 32, 64, . . . , in the Winnow protocol, steps 1 and 2 is implemented using various other methods. For example, to make the greatest common divisor of 'n' and a equal to 1, i.e., to satisfy g(n,a)=1, at least one of the length 'n' of the bit string subject to bit error reconciliation and the length 'a' of the block for the subsequent unit reconciliation process may be increased or decreased. Four steps of the permutation algorithm of FIG. 3 are implemented by, for example, one or more processors and/or application-specific integrated circuits (ASICs) which are equipped with or included in a specific or dedicated device or computer to perform the permutation algorithm.

Figure 4:
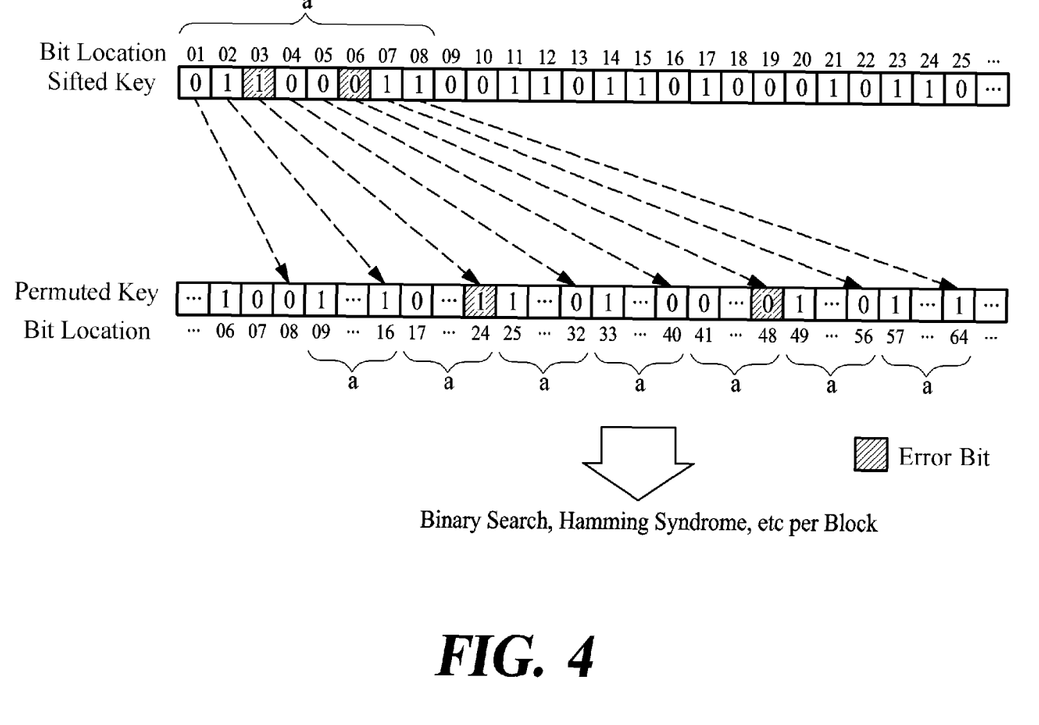
FIG. 4 is a diagram of an exemplary method for permuting bits in a bit string by using a linear modulo operation according to at least one embodiment of the present disclosure.

FIG. 4 is a diagram of an exemplary method for permuting bits in a bit string with a linear modulo operation according to at least one embodiment of the present disclosure.

FIG. 4 illustrates a method for permuting a bit at location 'x' to location F(x) using Equation 1 on the assumption that the size of a block for a subsequent unit reconciliation process is 8 bits. As illustrated in FIG. 4, bits in the same block are rearranged to different blocks by performing a linear modulo operation. Therefore, error bits in the same block are also dispersed to different blocks. Particularly, it is shown that the linear modulo operation is very effective to distribute continuous error bits, i.e., burst bits.

Furthermore, in terms of operation efficiency, while a known random permutation algorithm involves generating permutation information by repeatedly performing random number sequence call and bit memory swapping 'n' times by using the TRNG/PRNG and applying the permutation information to each of 'n' bits to perform n! random permutations, some embodiments of the present disclosure provide the permutation method that is as simple as 'n' linear modulo operations and allows the parallel operation processing to be used.

Besides, in terms of communication, unlike a known random shuffling scheme, permutation information such as a random number sequence does not need to be shared with the other communication party through a communication channel.

Although the above description illustrates a permutation algorithm according to at least one embodiment of the present disclosure as applied to the Winnow protocol, the permutation algorithm is also applicable to quantum key reconciliation protocols performing an iterative reconciliation process and, more particularly, to all quantum key reconciliation protocols performing an iterative reconciliation process composed of multiple reconciliation steps each configured to divide a bit string into blocks and then to perform a predetermined operation for error bit reconciliation.

Some embodiments as described above, for example, each step in the flowchart of FIG. 3 are able to be implemented in the form of one or more program commands that can be read and executed by a variety of computer systems and be recorded in any non-transitory, computer-readable recording medium. The non-transitory computer-readable recording medium includes a program command, a data file, a data structure, etc. alone or in combination. The program commands written to the medium are designed or configured especially for the at least one embodiment, or known to those skilled in computer software. Examples of the non-transitory computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, an EPROM memory, an EEPROM memory, and a flash memory. Examples of a program command include a premium language code executable by a computer using an interpreter as well as a machine language code made by a compiler. The hardware device is configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

According to various embodiments of the present disclosure as described above, since a transmitter and a receiver perform permutation using a linear modulo operation, unlike a known random permutation scheme, a random number sequence generated using a TRNG/PRNG is not required, and permutation information needs not be transmitted and thus there is no time delay.

In addition, all bits in the same block in an earlier unit reconciliation process are rearranged to be distributed to different blocks before a subsequent unit reconciliation process. Particularly, a permutation algorithm according to some embodiments of the present disclosure is very effective to disperse continuous error bits, i.e., burst bits.

Furthermore, in terms of operational efficiency, a known algorithm, which has generated permutation information by repeatedly performing random number sequence call and bit memory swapping n times by using a TRNG/PRNG and applied the permutation information to each of n bits to perform n! random permutations, is replaced by a permutation method as simple as applying a linear modulo operation to each bit. Particularly, parallel operation processing may be used in this method.

Although exemplary embodiments of the present disclosure have been described for illustrative purposes, those skilled in the art will appreciate that various modifications, additions and substitutions are possible, without departing from the spirit and scope of the claimed invention. Specific terms used in this disclosure and drawings are used for illustrative purposes and not to be considered as limitations of the present disclosure. Therefore, exemplary embodiments of the present disclosure have been described for the sake of brevity and clarity. Accordingly, one of ordinary skill would understand that the scope of the claimed invention is not limited by the explicitly described above embodiments but by the claims and equivalents thereof.

What is claimed is:

1. A method for reconciling bit errors in a sifted key generated through a quantum key distribution (QKD) protocol, at least one application-specific integrated circuit (ASIC) to implement the method comprising: repeatedly performing a reconciliation step comprising the substeps of:
receiving a signal for dividing a bit string subject to bit error reconciliation into one or more blocks each having a predetermined length of a block;
searching for, in response to the received signal, a block containing an odd number of bit errors among the divided one or more blocks by performing a parity check on each of the divided one or more blocks; and
reconciling the bit errors by performing a predetermined operation according to a reconciliation protocol on the block containing the odd number of the bit errors,
wherein the method further comprises:
changing at least one of the length (n) of the bit string and the predetermined length (a) of the block for a subsequent reconciliation step to satisfy gcd(n,a)=1,
wherein the bits in the bit string reconciled in a previous reconciliation step are permuted before the subsequent reconciliation step by performing a linear modulo operation without using random numbers,
the bits in the bit string through a step of permuting the bits are rearranged such that all bits in a same block in the previous reconciliation step are dispersed to different blocks in the subsequent reconciliation step to thereby disperse continuous error bits occurred from said all bits in the same block into the different blocks,
wherein the ASIC perform the linear modulo operation based on (i) a length of the reconciled bit string and (ii) the predetermined length of the block to be used for the subsequent reconciliation step,
wherein the linear modulo operation is given by F: x→ax+b (mod n), where 'x' denotes the location of a bit, 'a' denotes the predetermined length of the block to be used for the subsequent reconciliation step, 'b' denotes an arbitrary integer, and 'n' denotes the length of the bit string.

2. The permutation method of claim 1, wherein the ASIC is configured to
determine whether the length of the bit string which is subject to bit error reconciliation is an even number or an odd number, and
permute the bits in the string when the length of the bit string which is subject to bit error reconciliation is an odd number.

3. The permutation method of claim 2, wherein the ASIC is configured to
remove a last bit of the bits to thereby change the bit string to an odd number length when the length of the bit string which is subject to bit error reconciliation is an even number, and
permute bits in the changed bit string.

4. The method of claim 1, wherein the reconciliation step comprises:
determining whether the length of the bit string which is subject to bit error reconciliation is an even number or an odd number; and
permuting the bits in the string when the length of the bit string which is subject to bit error reconciliation is an odd number.

5. The method of claim 4, wherein the reconciliation step comprises:
removing a last bit of the bits to thereby change the bit string to an odd number length when the length of the bit string which is subject to bit error reconciliation is an even number; and
permuting bits in the changed bit string.

6. The method of claim 1,
wherein the changing of at least one of 'n' and 'a' comprises changing 'n' into an odd number if 'a' is a power of 2.

7. The method of claim 1, wherein the quantum key reconciliation protocol is a scheme for dividing a bit string resulting from each reconciliation step into blocks, and performing a predetermined operation on each block.

8. The method of claim 6, wherein the changing 'n' into an odd number includes removing a last bit from the bit string obtained from the previous reconciliation step.

9. A non-transitory computer-readable medium having instructions stored thereon, which, when executed by at least one application-specific integrated circuit (ASIC), cause the ASIC to perform permutation operations for reconciling bit errors in a quantum key reconciliation protocol performing an iterative reconciliation process, the permutation operations comprising:
  receiving a signal for a bit string obtained through a previous reconciliation step;
  permuting, in response to the received signal, bits in the bit string obtained from the previous reconciliation step before a subsequent reconciliation step by performing a linear modulo operation without using random numbers;
  rearranging the bits in the bit string through a step of permuting the bits such that all bits in a same block in the previous reconciliation step are dispersed to different blocks in the subsequent reconciliation step to thereby disperse continuous error bits occurred from said all bits in the same block into the different blocks; and
  providing the rearranged bit string to the subsequent reconciliation step,
  wherein the permutation operations further comprises:
  changing at least one of the length (n) of the bit string and the predetermined length (a) of the block for the subsequent reconciliation step to satisfy gcd(n,a)=1,
  wherein the ASIC perform the linear modulo operation based on (i) a length of the bit string and (ii) the predetermined length of the block to be used for the subsequent reconciliation step,
  wherein the linear modulo operation is given by F: x→ax+b (mod n), where 'x' denotes the location of a bit, 'a' denotes the predetermined length of the block to be used for the subsequent reconciliation step, 'b' denotes an arbitrary integer, and 'n' denotes the length of the bit string.

10. The non-transitory computer-readable medium of claim 9, wherein the changing of at least one of 'n' and 'a' comprises changing 'n' into an odd number if 'a' is a power of 2.

11. The non-transitory computer-readable medium of claim 9, wherein the quantum key reconciliation protocol is a scheme for dividing a bit string resulting from each reconciliation step into blocks, and performing a predetermined operation on each block.

12. The non-transitory computer-readable medium of claim 9, wherein the permutation operations comprises:
  determining whether the length of the bit string which is subject to bit error reconciliation is an even number or an odd number; and
  permuting the bits in the string when the length of the bit string which is subject to bit error reconciliation is an odd number.

13. The non-transitory computer-readable medium of claim 12, wherein the permutation operations comprises:
  removing a last bit of the bits to thereby change the bit string to an odd number length when the length of the bit string which is subject to bit error reconciliation is an even number; and
  permuting bits in the changed bit string.

* * * * *